United States Patent [19]
Fukuoka et al.

[11] Patent Number: 5,373,321
[45] Date of Patent: Dec. 13, 1994

[54] IMAGE PROCESSING APPARATUS FOR CORRECTING THE APERTURE OF A COMPRESSED SIGNAL

[75] Inventors: Hiroyuki Fukuoka, Hiratsuka; Koji Takahashi, Yokohama, both of Japan

[73] Assignee: Canon Kabushiki Kaisha, Tokyo, Japan

[21] Appl. No.: 962,724

[22] Filed: Oct. 19, 1992

[30] Foreign Application Priority Data

Oct. 21, 1991 [JP] Japan .................. 3-272622

[51] Int. Cl.⁵ .......................................... H04N 5/208
[52] U.S. Cl. .......................................... 348/252
[58] Field of Search ............... 358/209, 162, 166, 225; 348/252, 384, 253, 207; H04N 5/208

[56] References Cited

U.S. PATENT DOCUMENTS

| | | | |
|---|---|---|---|
| 4,706,122 | 11/1987 | Akiyama | 358/225 |
| 4,862,270 | 8/1989 | Nishio | 358/162 |
| 4,876,599 | 10/1989 | Kihara | 358/162 |
| 4,897,722 | 1/1990 | Flory | 358/180 |
| 5,153,727 | 10/1992 | Choi | 358/162 |

FOREIGN PATENT DOCUMENTS

60-192466  9/1985  Japan .................. 358/162

*Primary Examiner*—Joseph Mancuso
*Assistant Examiner*—Wendy R. Greening
*Attorney, Agent, or Firm*—Fitzpatrick, Cella, Harper & Scinto

[57] ABSTRACT

An image processing apparatus includes a discriminating circuit for determining a compression ratio of an image signal input thereto, the image signal being compressed in a horizontal direction. An aperture correction control circuit is provided for controlling frequency characteristics of an aperture correcting circuit in response to the output of the discriminating circuit. Correction characteristics in an expanded image signal to be output are made equivalent to frequency characteristics of an aperture correction operation to be conducted on a television signal having a predetermined aspect ratio.

14 Claims, 6 Drawing Sheets

IMAGE PROCESSING APPARATUS FOR CORRECTING THE APERTURE OF A COMPRESSED SIGNAL

BACKGROUND OF THE INVENTION

1. Field of the Invention

The present invention relates to an image processing apparatus in which image signals compressed in a horizontal direction by different compression ratios are subjected to aperture correction in which frequency characteristics are determined by the compression ratio.

2. Description of the Related Art

Conventionally, aperture correction is conducted on a currently available (NTSC) television signal having an aspect ratio of 3:4 to enhance the attenuated high-frequency components of the television signal which represent the contour thereof and thereby to improve the image quality.

Figure 1:
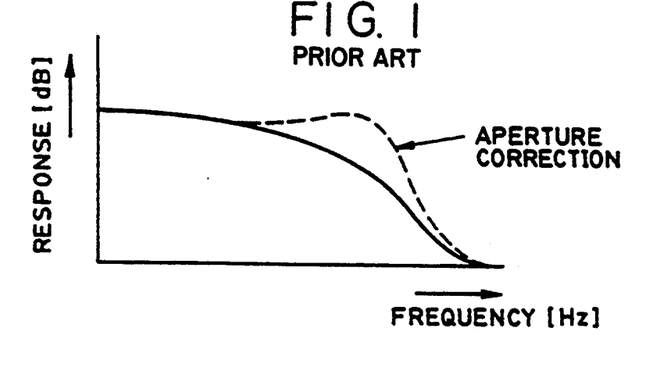
FIG. 1 illustrates how the frequency characteristics are improved by aperture correction.

FIG. 1 illustrates how the frequency characteristics of the television signal are improved by the above-described aperture correction operation. As shown in FIG. 1, the high-frequency component of a television signal, indicated by the solid line, is enhanced in the manner indicated by the broken line to improve the sharpness of an image obtained on the basis of that television signal.

However, when the aperture correction process conducted on the currently available television signals having an aspect ratio of 3:4 is applied to image signals which have been compressed in a horizontal direction by means of an anamorphic lens (a lens with cylindrical elements giving different magnifications in horizontal and vertical directions. In this embodiment, an image from an object is converted into an image which is expanded in the vertical direction by optically compressing the light from the object in the horizontal direction by means of the anamorphic lens), since the image signals have different energy distributions determined by the compression ratio, the process of expanding such compressed signals changes the frequency characteristics provided by the aperture correction process.

Practically, when a compressed image signal is received by a currently available television receiver having an aspect ratio of 3:4, the image quality of the expanded signal deteriorates due to the compression ratio of the received image signal.

Figure 2:
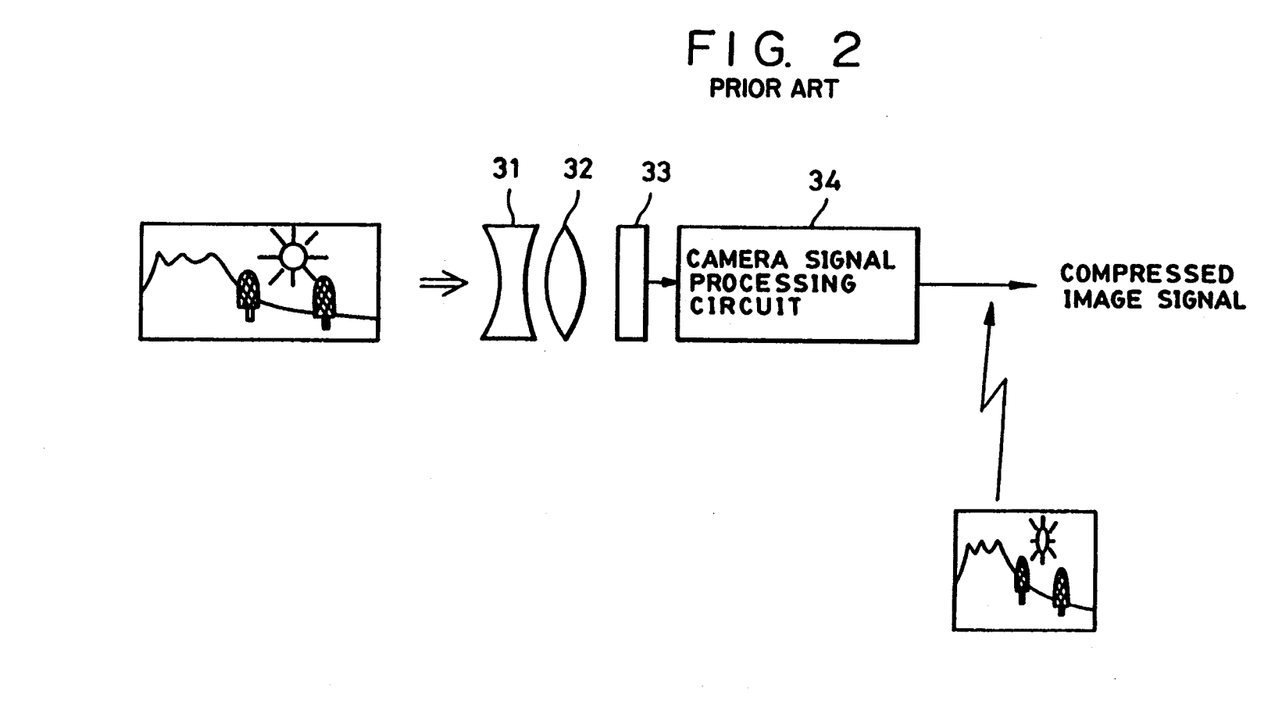
FIG. 2 illustrates a camera system which employs an anamorphic lens.
Figure 3:
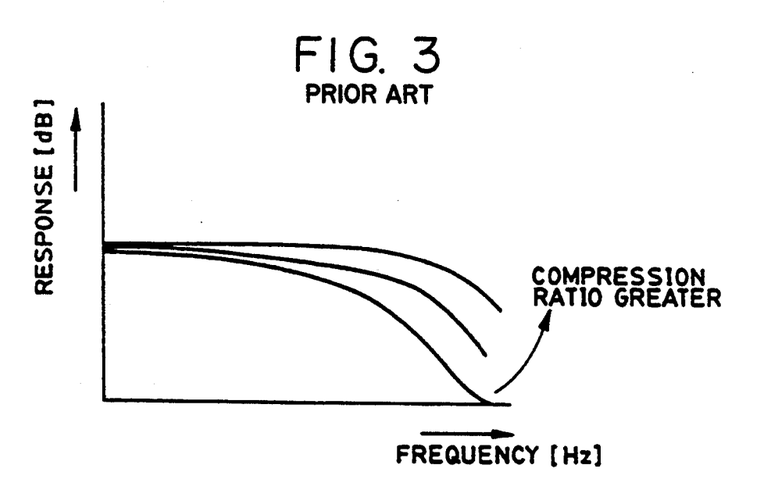
FIG. 3 is a graph showing the relation between the compression ratio and the energy distribution.
Figure 4:
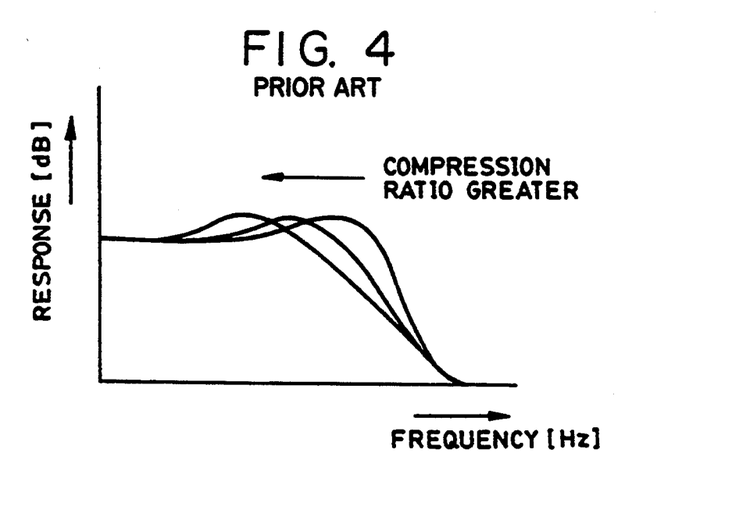
FIG. 4 shows how the expansion process changes the frequency characteristics of the signals having different compression ratios and on which the same aperture correction is conducted.

FIG. 2 schematically shows a camera system which employs an anamorphic lens 31, a zoom lens 32, an imaging device 33 having an aspect ratio of 3:4, and a known signal processing signal 34 for processing the image signal output from the imaging device 33 in the known manner. FIG. 3 is a graph showing the relation between the compression ratio and the energy distribution of the compressed signal. FIG. 4 shows how the expansion process changes the energy distributions of the image signals on which the same aperture correction is conducted. As is apparent from FIG. 4, as the compression ratio increases, the energy level of the high-frequency components decreases. Thus, when image signals having various compression ratios are expanded, image quality deteriorates.

SUMMARY OF THE INVENTION

In view of the aforementioned drawbacks of the conventional technique, an object of the present invention is to provide an image processing apparatus which enables uniform image quality to be obtained by a television receiver having a predetermined aspect ratio regardless of the compression ratio of an input image signal.

To achieve the aforementioned object, the present invention provides an image processing apparatus which comprises a discriminating circuit for determining a compression ratio of an image signal input thereto in a state wherein the image signal is compressed in a horizontal direction, and an aperture correction control circuit for controlling frequency characteristics of an aperture correcting circuit in response to the output of the discriminating circuit. The correction characteristics in an expanded image signal to be output are made equivalent to frequency characteristics of an aperture correction operation to be conducted on a television signal having a predetermined aspect ratio. That is, the correction characteristics are set such that they equalize the frequency characteristics of the expanded image signals regardless of the compression ratio of the input images.

In the present invention, the discriminating circuit determines the compression ratio of an image signal input thereto in a state wherein the image signal is compressed in a horizontal direction, and the aperture correction control circuit changes the frequency characteristics of the aperture correcting circuit using the output of the discriminating circuit as a control signal. Thus, even when the signal is expanded and then cut out (trimmed) so that it can be received by the currently available television receiver having an aspect ratio of 3:4, the image signal has the aperture characteristics which are equivalent to the frequency characteristics of the aperture correction process to be conducted on the currently available television signal having an aspect ratio of 3:4.

According to another aspect of the present invention, apparatus for enhancing the aperture of a compressed image signal includes means for receiving the compressed image signal, and means for detecting a compression ratio of the received compressed image signal. Means are provided for enhancing a frequency of an aperture of the received compressed image signal, the means for enhancing being capable of enhancing different frequencies in accordance with the detected compression ratio.

According to another aspect of the present invention, a camera includes an anamorphic lens for receiving an image and compressing it in a horizontal direction. Image pickup means are provided for picking up the compressed image from the anamorphic lens and converting it into an electrical compressed image signal. Detecting means are provided for detecting a compression ratio of the electrical compressed image signal. Aperture enhancing means are provided for enhancing frequency characteristics of an aperture of the electrical compressed image signal in accordance with the detected compression ratio.

According to yet a further aspect of the present invention, image processing apparatus includes a command discrimination circuit for receiving a compressed image signal and determining a compression ratio thereof. An aperture correction circuit is provided for receiving the compressed image signal and enhancing frequency characteristics of an aperture thereof, the aperture correction circuit being capable of varying the frequency of the enhancement in accordance with the detected compression ratio. A recording/reproducing device is provided for recording the enhanced compressed image signal on a recording medium, and for reproducing the enhanced compressed image signal from the recording medium. A processing circuit is provided for expanding and trimming the reproduced enhanced compressed image signal to produce a video signal having a predetermined aspect ratio.

Other objects and advantages of the invention will become apparent during the following discussion of the accompanying drawings.

DETAILED DESCRIPTION OF THE PREFERRED EMBODIMENTS

An embodiment of the present invention will be described below with reference to the accompanying drawings.

Figure 5:
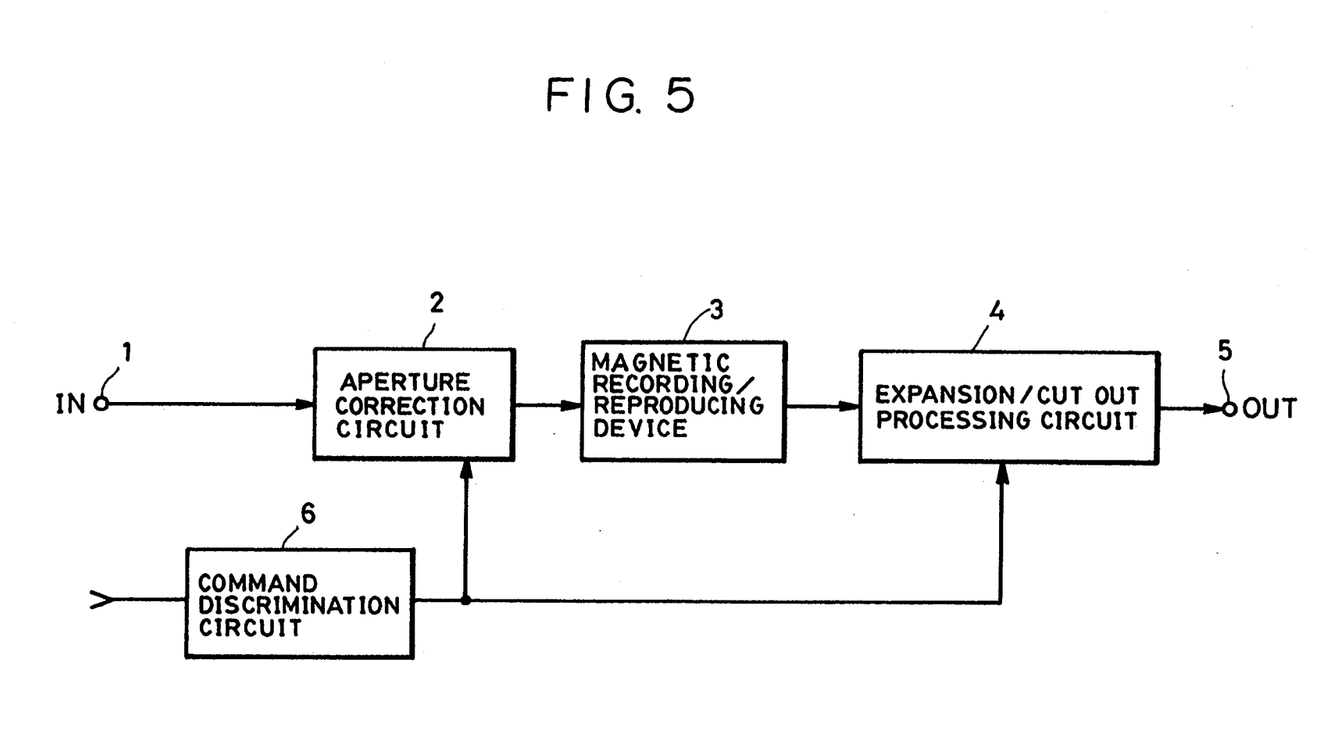
FIG. 5 is a block diagram of an image processing apparatus to which the present invention is applied.
Figure 6:
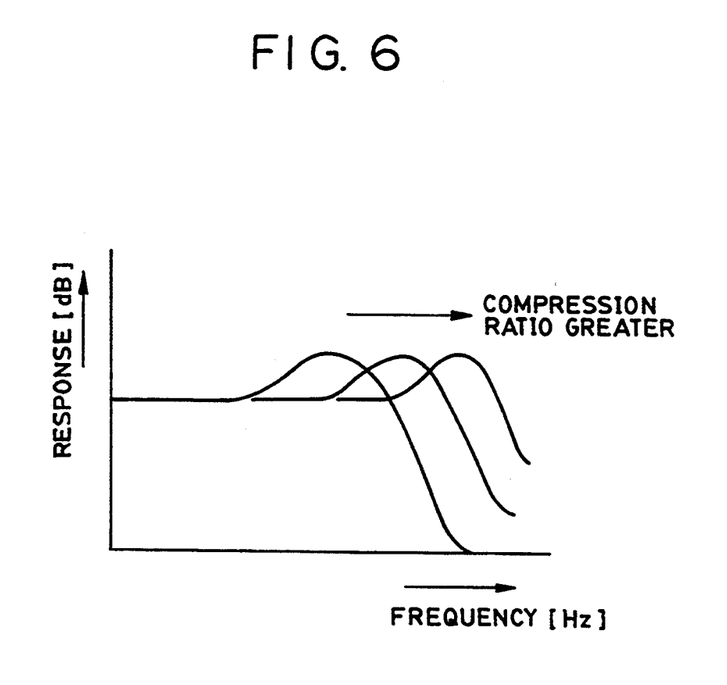
FIG. 6 shows the frequency characteristics of an aperture correcting circuit.
Figure 7:
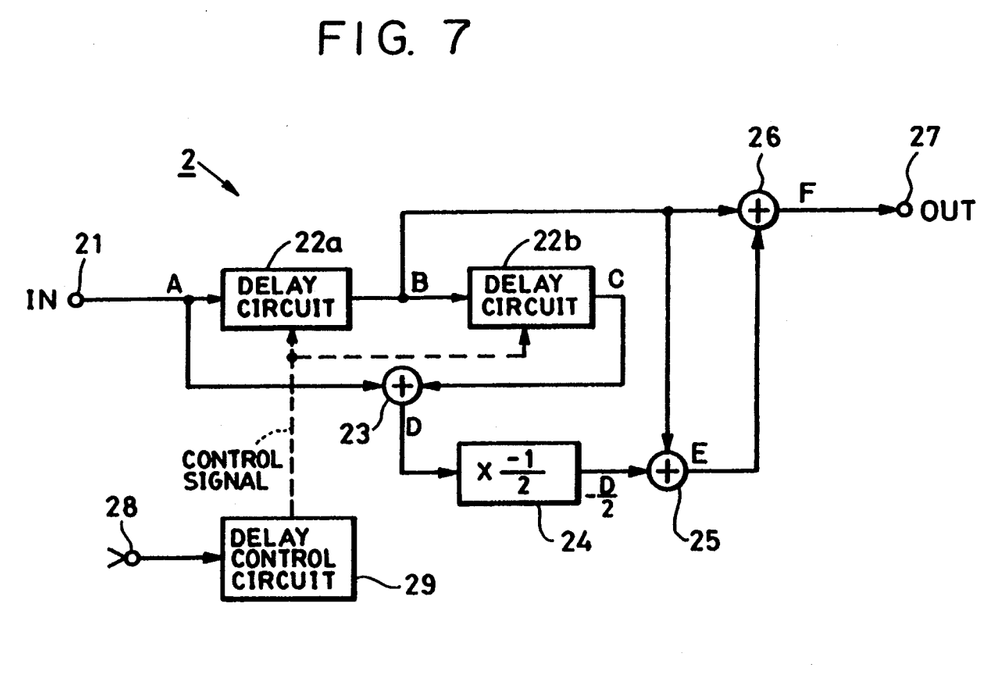
FIG. 7 shows the practically employed example of the aperture correcting circuit.
Figure 8:
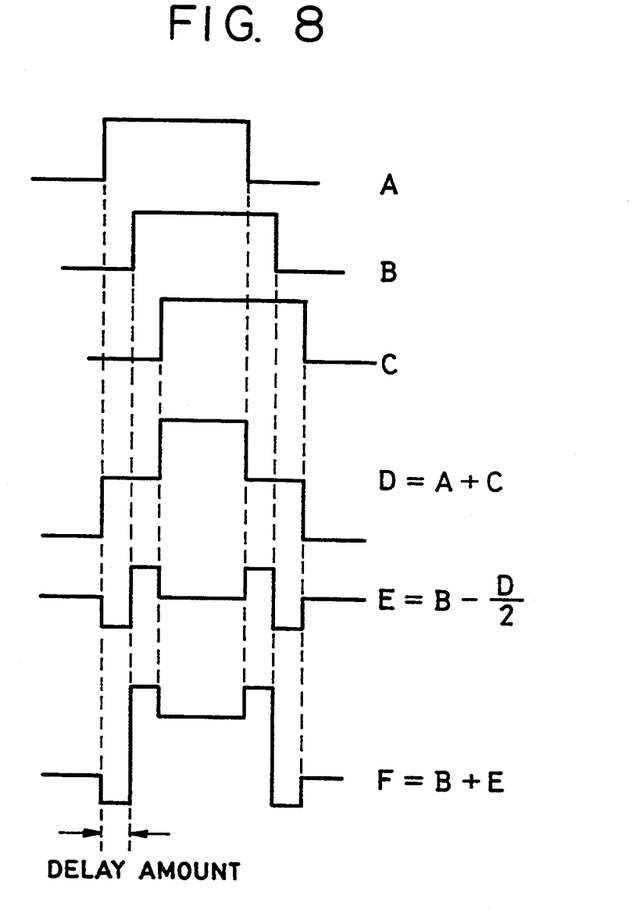
FIG. 8 shows the waveforms of signals obtained in the aperture correcting circuit shown in FIG. 7.

FIG. 5 illustrates an image processing apparatus which includes a magnetic recording/reproducing device and to which the present invention is applied. FIG. 6 shows the effect of the embodiment which is provided on an input image signal. FIG. 7 is a circuit diagram of the embodiment. FIG. 8 shows the waveforms of individual components of the circuit shown in FIG. 7.

Referring first to FIG. 5, an image signal compressed in a horizontal direction is input to an input terminal 1. The image signal may be one which is obtained through the anamorphic lens 31 shown in FIG. 2. In FIG. 2, reference numeral 32 denotes a zoom lens; 33, an imaging device having an aspect ratio of 3:4; and 34, a generally employed camera signal processing circuit.

The image signal input to the input terminal 1 is corrected by an aperture correction circuit 2. The frequency characteristics of the aperture correcting circuit 2 are controlled in accordance with the compression ratio by a control signal output from a command discrimination circuit 6 in the manner shown in FIG. 6 (that is, the larger the compression ratio of an image signal, the higher the frequency enhanced by the enhancer). The control signal output from the command discrimination circuit 6 varies the correction characteristics of the aperture correcting circuit 2 in accordance with the compression ratio of an input image signal. That is, the control signal sets the correction characteristics of the aperture correcting circuit 2 such that the aperture correcting circuit 2 enhances the high-frequency component of the image signal commensurate with the increase of the compression ratio. Consequently, no matter what compression ratio the input image signal may have, the frequency characteristics of the expanded image signals will be substantially the same. The command discrimination circuit 6 may be constructed such that it extracts a predetermined frequency signal contained in the input image signal as the compression ratio data by means of filter means and determines the compression ratio of the input image signal on the basis of the output of the filter means. Alternatively, the command discrimination circuit 6 may be constructed such that it extracts the compression ratio data located at a predetermined position of the input image signal by means of a gate circuit to determine the compression ratio.

The image signal output from the aperture correction circuit 2 is input to a magnetic recording/reproducing device 3 where it is recorded on a magnetic medium.

An expansion/cut out processing circuit 4 expands the reproduced image signal obtained by reproducing the image signal recorded on the magnetic medium in the horizontal direction and cuts it out so that the signal is suitable as a currently available television signal having an aspect ratio of 3:4, and outputs the processed signal as an image signal having an aspect ratio of 3:4. The expansion/cut-out processing is a process in which the portion of the compressed image signal obtained by compressing an input image signal having an aspect ratio of, for example, 3:7 in the horizontal direction, which corresponds to a currently employed television signal having an aspect ratio of 3:4, is cut out, and in which the cut out signal is expanded such that it has an aspect ratio of 3:4. The cut-out process may be performed by storing the input image signal in a memory and then by reading out the stored image signal from a designated address. The expansion process may be conducted by reading out the image signal from the memory using a read-out clock having a frequency lower than that of the writing clock. At that time, the expansion/cut out processing circuit 4 is controlled by the command discrimination circuit 6. Examples of the compression of an image signal include compression of an image signal having an aspect ratio of 3:7 in the horizontal direction such that the compressed image signal has an aspect ratio of 3:4, compression of an image signal having an aspect ratio of 3:8 in the horizontal direction such that the compressed signal has an aspect ratio of 3:4, and so on. In the expansion/cut-out circuit 4, when the compressed image signal compressed from the image signal having an aspect ratio of 3:8 is to be cut out, the portion of the compressed image signal which is to be cut out must be made smaller than the cut out portion of the compressed image signal compressed from the image signal having an aspect ratio of 3:7. Such a control is conducted on the basis of the output of the command discrimination circuit 6.

FIG. 7 shows an example of the aperture correcting circuit 2 which employs a quadratic differential. The operation of the aperture correction circuit 2 shown in FIG. 7 will be described with reference to FIG. 8.

The image signal input to an input terminal 21 passes through delay circuits 22a and 22b. A delay control circuit 29 controls the amount of delay of the delay circuits 22a and 22b and thereby controls the frequency characteristics of the aperture correcting circuit 2. The high-frequency component of the output (which is indicated by F in FIG. 8) of the aperture correction circuit can be varied by varying the amount of delay of each of the delay circuits 22a and 22b. That is, the high-frequency component of the output of the aperture correction circuit is further enhanced by reducing the amount of delay, and is less enhanced by increasing the amount of delay.

An adder 23 adds a signal A input to the input terminal 21 to an output C of the delay circuit 22b and produces an output D.

The output D is multiplied by $-(\frac{1}{2})$ by a multiplier 24. An adder 25 adds the output of the multiplier 24 to an output B of the delay circuit 22a and produces an output E which is the result of the operation expressed by $B-(D/2)$.

An adder 26 adds the output E which is the aperture correcting signal to the output B of the delay circuit 22a and produces an output signal F, which is an image signal on which aperture correction has been made, at an output terminal 27.

As will be understood from the foregoing description, in the present embodiment, the frequency characteristics of the aperture correction operation can be changed in accordance with the compression ratio of the image signal compressed in the horizontal direction. As stated above, the correction characteristics, i.e., the frequency characteristics, of the aperture correction circuit can be controlled by variably setting the amount of delay in the aperture correction circuit. Consequently, the frequency characteristics of the image signal subjected to the expansion process are constant, and even when the cut out process is conducted on the expanded image signal so that the signal can be received by the existing television receiver having a fixed aspect ratio, it is possible to obtain a screen image in which the degree of enhancement of the contour is fixed.

In the aforementioned embodiment, to change the characteristics of the aperture correction operation, the amount of delay of the delay circuit 22a is changed. However, the present invention is not limited to this and any other means can be employed as long as it can change the aperture correction characteristics.

The individual components shown in outline or designated by blocks in the Drawings are all well-known in the image processing arts and their specific instruction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus comprising:
   a discriminating circuit for determining a compression ratio of an image signal input thereto, said image signal being compressed in a horizontal direction;
   an aperture correction circuit for correcting an aperture of the compressed image signal; and
   an aperture correction control circuit for controlling frequency characteristics of said aperture correction circuit in response to the output of said discriminating circuit.

2. Apparatus according to claim 1, wherein said aperture correction circuit includes a delay circuit for delaying the image signal, and wherein said aperture correction control circuit controls an amount of delay of the delay circuit to control frequency characteristics of said aperture correction circuit.

3. Apparatus according to claim 1, further comprising an expansion circuit for expanding the aperture-corrected compressed image signal such that frequency characteristics of the expanded signal are equivalent to frequency characteristics of a television signal having a predetermined aspect ratio.

4. Apparatus for enhancing the aperture of a compressed image signal, comprising:
   means for receiving the compressed image signal;
   means for detecting a compression ratio of the received compressed image signal; and
   means for enhancing a frequency of an aperture of the received compressed image signal, said means for enhancing being capable of enhancing different frequencies in accordance with the detected compression ratio.

5. Apparatus according to claim 4, wherein said means for enhancing comprises first and second delay circuits for delaying the received compressed image signal, and a delay control circuit for controlling delay amounts of the delay circuit in accordance with the detected compression ratio.

6. Apparatus according to claim 4, further comprising a recording/reproducing device for recording/reproducing the enhanced compressed image signal to/from a recording medium.

7. Apparatus according to claim 6, further comprising an expansion circuit for expanding the enhanced compressed image signal reproduced from the recording medium.

8. Apparatus according to claim 4, further comprising an expansion/cut-out circuit, coupled to said means for detecting, for expanding the enhanced compressed image signal and trimming it in accordance with the detected compression ratio.

9. A camera comprising:
   an anamorphic lens for receiving an image and compressing it in a horizontal direction;
   image pickup means for picking up the compressed image from said anamorphic lens and converting it into an electrical compressed image signal;
   detecting means for detecting a compression ratio of the electrical compressed image signal; and
   aperture enhancing means, coupled to said image pickup means and to said detecting means, for enhancing frequency characteristics of an aperture of the electrical compressed image signal in accordance with the detected compression ratio.

10. A camera according to claim 9, wherein said aperture enhancing means comprises:
    first and second delay circuits for respectively delaying the electrical compressed image signal; and
    a delay control circuit for controlling a delay amount of each of said first and second delay means in accordance with the detected compression ratio.

11. A camera according to claim 9, further comprising recording/reproducing means for recording/reproducing the enhanced compressed image signal to/from a recording medium.

12. A camera according to claim 11, further comprising an expansion circuit, coupled to said recording/reproducing means, for expanding the reproduced enhanced compressed image signal.

13. A camera according to claim 12, wherein said expansion circuit includes a cut-out circuit for trimming the expanded signal so that it corresponds to a predetermined aspect ratio.

14. Image processing apparatus includes a command discrimination circuit for receiving a compressed image signal and determining a compression ratio thereof;

an aperture correction circuit, coupled to said command discrimination circuit, for receiving the compressed image signal and enhancing frequency characteristics of an aperture thereof, said aperture correction circuit being capable of varying the frequency of the enhancement in accordance with the detected compression ratio;

a recording/reproducing device, coupled to said aperture correction circuit, for recording the enhanced compressed image signal on a recording medium, and for reproducing the enhanced compression image signal from the recording medium; and a processing circuit, coupled to said recording/reproducing device, for expanding and trimming the reproduced enhanced compressed image signal to produce a video signal having a predetermined aspect ratio.

* * * * *

UNITED STATES PATENT AND TRADEMARK OFFICE
CERTIFICATE OF CORRECTION

PATENT NO.  : 5,373,321
DATED       : December 13, 1994
INVENTOR(S) : HIROYUKI FUKUOKA, ET AL.

It is certified that error appears in the above-indentified patent and that said Letters Patent is hereby corrected as shown below:

Column 4

Line 17, "expansion/cut out" should read --expansion/cut-out--.
Line 30, "cut out" should read --cut-out--.
Line 38, "sion/cut out" should read --sion/cut-out--.
Line 51, "cut out" should read --cut-out--.

Column 5

Line 28, "cut out" should read --cut-out--.

Column 6

Line 36, "detecting," should read --detecting, and--.
Line 57, "means" should read --circuits--.

UNITED STATES PATENT AND TRADEMARK OFFICE
CERTIFICATE OF CORRECTION

PATENT NO. : 5,373,321
DATED : December 13, 1994
INVENTOR(S) : HIROYUKI FUKUOKA, ET AL.

It is certified that error appears in the above-indentified patent and that said Letters Patent is hereby corrected as shown below:

Column 7

Line 3, "includes" should read —including—.

Signed and Sealed this

Twenty-fifth Day of July, 1995

Attest:

BRUCE LEHMAN

Attesting Officer   Commissioner of Patents and Trademarks